Oct. 1, 1968 C. H. GILBERT 3,404,312
GROUNDED SHAFT STRUCTURE FOR ELECTRICAL ROTATING MACHINE
Filed Sept. 20, 1966 2 Sheets-Sheet 1

INVENTOR.
CHARLES H. GILBERT
BY
ATTORNEY

United States Patent Office 3,404,312
Patented Oct. 1, 1968

3,404,312
GROUNDED SHAFT STRUCTURE FOR
ELECTRICAL ROTATING MACHINE
Charles H. Gilbert, La Mirada, Calif.
(541 Teakwood, La Habra, Calif. 90631)
Filed Sept. 20, 1966, Ser. No. 580,733
7 Claims. (Cl. 317—13)

The subject invention relates to electrical grounding devices, and more particularly to a device for electrical grounding of the shafts of rotating machines.

Frequently, in the operation of rotary electrical machinery, it is required that the non-electrical portions of such machinery be adequately grounded or maintained at earth potential. Such requirement may arise from a number of reasons, such as the electrical safety of personnel operating such machinery, the reduction of radio interference or "static" produced by stray electric currents, and reduction of spurious electrical sparking in a potentially explosive environment. Prior-art practices in the grounding of electrical machines have, in general, been restricted to merely grounding the metallic frame or base of a machine, the rotating shaft of the machine being grounded to the frame by means of the bearing assembly which rotatably mounts the shaft. Such failure to separately ground the shaft (other than through the bearings thereof) allows an electrical potential to exist across such bearings in the electrical circuit thus interposed between the frame and rotatable shaft. Because a bearing assembly is designed to provide a minimum surface area to sliding and rolling friction forces, such minimum area also provides a grounding impedance of somewhat less than a desired maximum conductance. Also, the presence of non-conductive lubricant films on such minimal bearing surfaces serves to further increase the impedance (or decrease the conductance) of the grounding path provided by such bearing assemblies. Further, the relative motion between the minimal contact surfaces of the bearing assembly induces sparking between them, leading to pitting and roughening of the bearing surfaces and increased rates of bearing wear. Moreover, in an electrical welding machine such impedance path, provided through the bearings, tends to vary, thus varying the quality of the electrical weld achieved.

By means of the concept of the subject invention, means is provided for improving grounding of a rotating shaft and avoiding the above-noted disadvantages and short-comings of prior-art grounding methods.

In a preferred embodiment of the subject invention, there is provided a metallic casing adapted to be mounted in electrical contact with an earth potential, the casing providing an enclosure for confining a quantity of liquid mercury. A metallic shaft is mounted for rotation within the casing, and has a portion externally thereof and adapted to be mechanically coupled in electrical contact with a rotating shaft-to-be-grounded, a plurality of metallic plates fixedly mounted thereon at successive intervals or spacings therealong and oriented transversely thereof. The quantity of mercury contained in the casing is sufficient to contact at least a portion of the surface of each of the plates, so as to provide a low impedance path between a shaft-to-be-grounded and the casing. In this way, a ground current flowing through a bearing assembly of a shaft-to-be-grounded tends to be reduced. Further, the low impedance paths provided by the functional elements of the grounding device, is not subject to variation or increase due to wear. Thus, an improved, constant-quality electrical weld may be achieved by electrical welding machines employing the device of the invention.

Accordingly, it is an object of the subject invention to provide improved electrical grounding means.

It is another object of the invention to provide improved means for grounding a rotating shaft.

It is a further object to provide electrical grounding means for reducing the flow of grounding circuit through the bearing assembly of a rotatable shaft-to-be-grounded.

A still further object is to provide grounding means, the functional elements of which are not subject to wear from cooperation with a rotating shaft.

These and other objects of the invention will become apparent from the following description, taken together with the accompanying drawings, in which.

In the figures, like reference characters refer to like parts.

Figure 1:
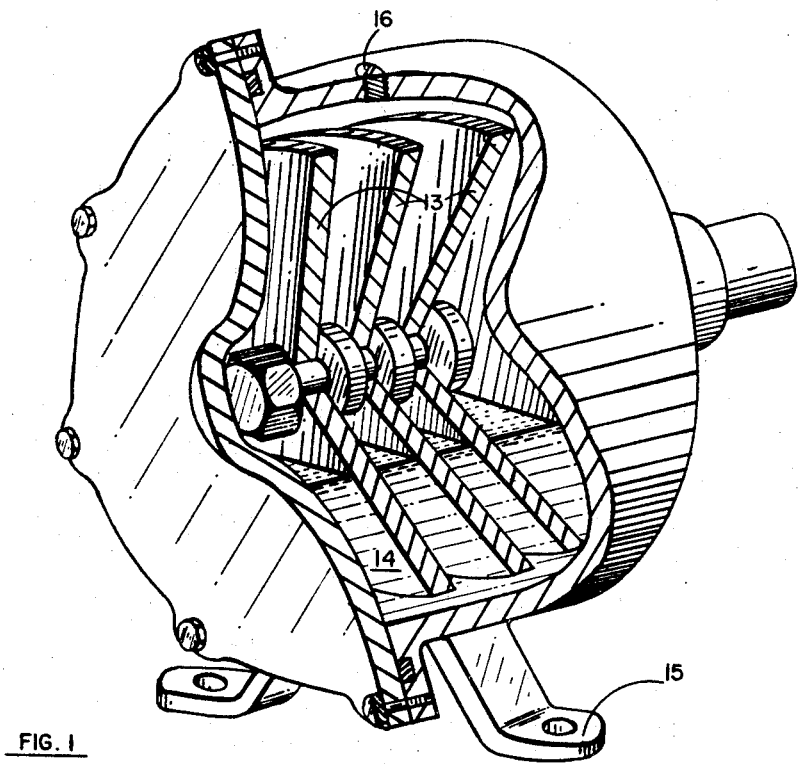
FIG. 1 is an isometric view, partially torn away, illustrating a preferred embodiment of the invention.

Referring now to FIG. 1, there is illustrated an isometric view, partially torn away, of a preferred embodiment of the invention. There is provide an electrical grounding device for cooperation with a substantially-horizontal, rotatable shaft-to-be-grounded, and comprising a metallic casing 10 having lugs or legs 15 or otherwise adapted to be mounted in electrical contact with an earth potential. Such casing might, for example, be mounted on the grounded frame of the machine having the shaft-to-be-grounded. The interior of casing 10 is preferably substantially cylindrical and provides an enclosure for a quantity of liquid mercury 14, which may be introduced by temporary removal of filter plug 16 for such purpose.

Figure 2:
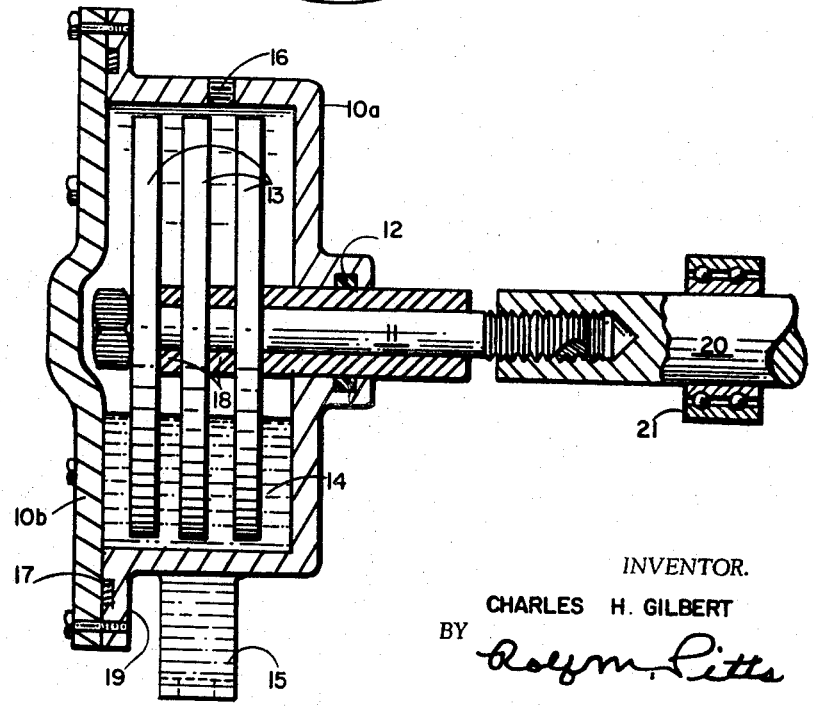
FIG. 2 is a central section in elevation (or vertical center section) of the device of FIG. 1.

There is also provided a metallic shaft 11 rotatably mounted within casing 10 and axially restrained relative thereto by means described more fully in connection with the description of FIG. 2, the longitudinal axis of shaft 11 being preferably coincident with the longitudinal axis of revolution of the cylindrical cavity of casing 10. A plurality of circular metallic plates 13 are fixedly mounted (through their respective centers) upon shaft 11, axially spaced therealong and oriented transversely thereof. The quantity of mercury 14 included in the cavity of casing 10 is made adequate to contact at least a portion of the surface of each of plates 13 when casing 10 is oriented with shaft 11 in a substantially horizontal orientation. In this way, a current path of improved conductivity is provided from shaft 11 to casing 10 by means of plates 13 and mercury 14, whereby current flow through the bearing of a shaft-to-be-grounded is reduced, as may be seen more particularly in FIG. 2.

Referring to FIG. 2, there is illustrated a central section in elevation (or vertical center section) of a preferred arrangement of the device of FIG. 1, shown in cooperation with a rotatable shaft-to-be-grounded 20, which is shown mounted for axially-restrained rotation by means such as a radial bearing assembly 21. Shaft 11 may be comprised of a bolt which may threadably engage, or be otherwise fastened to, shaft 20, while axial spacing between discs 13 may be provided by means of washers 18. From such section view may also be seen a dust seal 12 to prevent contamination of the liquid mercury 14. It may also be seen from such section view that a short length of shaft 11 relative to the diameter thereof (say, interior length equal to about twice the shaft diameter) allows an optimum ratio approaching unity, for the ratio of the impedance of the shaft to the impedance from the shaft along the unimmersed portions of plates 13 into the mercury 14, while at the same time such short axial dimension relative to the radial dimension of plates 13 and partially filled cavity of casing 10 provides a reduced over-all impedance (or high conductance).

Element 12 has been described as serving as a dust seal, and need not be a hermetic seal or other expensive means for preventing leakage of the liquid mercury for the reason that the mercury liquid level is preferably below the level of the dust seal 12. Further, the sensitivity of the liquid level to free surface action caused by vibration or variations from a substantially level orientation of the device of FIGS. 1 and 2 is reduced in two ways. First, the total free surface area is minimized, as a ratio of area to volume, by means of the above-noted minimum ratio of axial length to radial dimension of casing 10. Secondly, such potential free surface action in an axial direction is further reduced by means of the plurality of transverse bulkheads provided by plates 13.

It may be further seen from FIG. 2 that casing 10 may be conveniently fabricated in two pieces such as, for example, a major piece 10a comprising a cylindrical section, sealed at one end, which sealed end may be pierced and extruded, or otherwise formed, to accommodate dust seal 12. The opposite or open end of major piece 10a may include a lip 19 having an annular groove 17 in which a ring seal may be installed for sealing the enclosed cavity formed by fastening a second or end piece 10b over the open end of the first piece 10a of the two-piece casing, or other suitable means to prevent leakage of the mercury. Such fastening may be effected by threaded fasteners or like fastener means well-known in the art. The insulative interface thus interposed by the ring seal between the two casing pieces will not materially affect the over-all impedance of the arrangement because of the substantial common electrical interconnection afforded by the liquid mercury between the casing pieces 10a and 10b and the plates 13.

Although the embodiments of the invention shown in FIGS. 1 and 2 have been illustrated and described as cooperating with a horizontal shaft-to-be-grounded, the concept of the invention is not so limited. By suitable rearrangement, the device may be conveniently adapted for cooperation with a vertically oriented shaft, as shown more particularly in FIG. 3.

Figure 3:
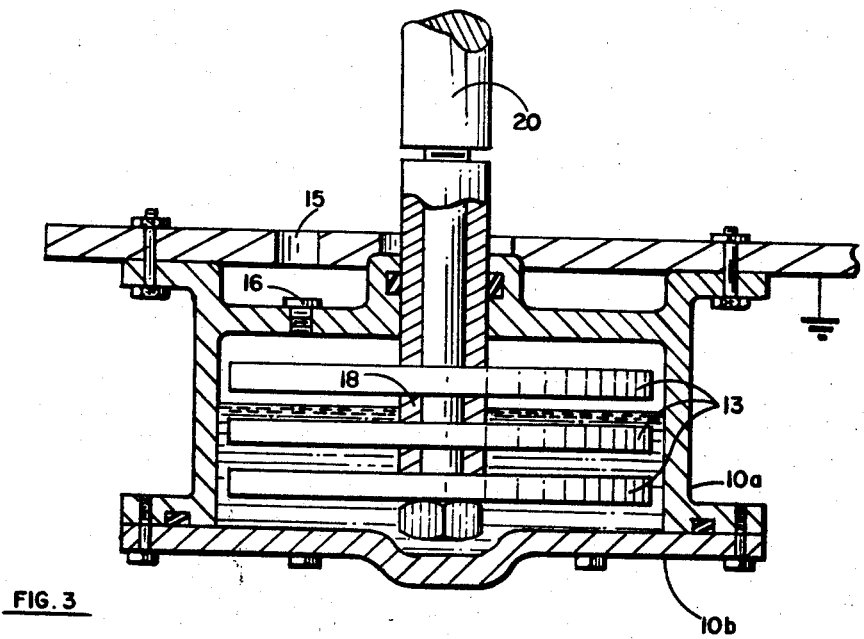
FIG. 3 is an alternate arrangement of the device of FIGS. 1 and 2 adapted for cooperation with a vertically oriented rotatable shaft.

Referring now to FIG. 3, there is shown an alternate arrangement of the device of FIG. 2, arranged to cooperate with a vertically oriented shaft 20. In such arrangement, the mounting lugs 15 of the device of the invention are arranged to secure the casing 10 to a frame or bed of the machine of which shaft 20 is a part. In the specific arrangement of FIG. 3, mounting lugs 15 are located on the upper end of vertically oriented casing 10 for securing the casing to the underside of a machine bed 23, through which bolt 11 projects to threadably engage shaft 20. The interior of casing 10 is filled with liquid mercury 14 below the level of the dust seal 12, as in the embodiment of FIG. 2, and preferably below the level of the topmost one of plate 13, in which latter situation the topmost plate cooperates with casing 10 as a labyrinthine chamber to prevent splashing of the mercury and leakage thereof through dust seal 12. The filling of the interior of casing 10 may be accomplished by removal of filler plug 16, located on the upper end of casing 10. Where required, access thereto may be provided for by means of a hole in plate 23. Alternate provisions may be provided, such as locating filler plug 16 in the cylindrical side of casing 10 at or above the preferred limit height of mercury 14.

In assembling the device of FIGS. 2 and 3, the spacers 18 and plates 13 are arranged on bolt 11, and casing piece 10a introduced over the threaded end of bolt 11 last, then the threaded end of bolt 11 is made to engage the end of shaft 20, and lugs 15 are fastened into place on the source of earth potential. Next, the casing plate 10b is sealingly fastened over the mouth of casing piece 10a. Finally, the filler plug 16 is removed, an appropriate amount of liquid mercury 14 introduced, and the filler plug re-inserted.

Figure 4:
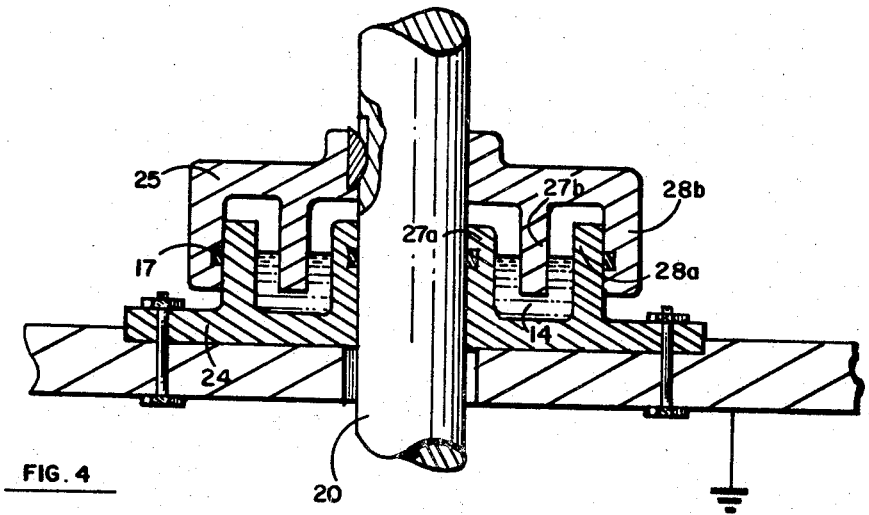
FIG. 4 is an alternate embodiment of the arrangement of FIG. 3.

An alternate arrangement of the device of FIG. 3 is shown in FIG. 4.

Referring to FIG. 4, there is illustrated a vertical center section of an alternate embodiment of the inventive concept, applied to the grounding of a vertically-oriented rotatable shaft 20. There is provided a first and second metallic vessel 24 and 25, each having mutually concentric outer and inner cylindrical sides 27 and 28 to define an annular mouth therebetween at an axial extremity thereof, with at least the like annular area at the other extremity thereof being sealed. Vessels 24 and 25 are adapted to matingly engage, whereby the inner side 27b of a second one 25 of vessels 24 and 25 nests within the annular space between the sides of a first one 24 of vessels 24 and 25, and the outer side 28a of first vessel 24 nests within the annular space between the sides of the second vessel 25. The nested vessels 24 and 25 are adapted to be mounted in a vertical axial orientation, whereby a lower one of them may contain a quantity of liquid mercury 14 in contact with a portion of the nested side of the other of the vessels. One of the vessels is further adapted to be mounted upon, and preferably concentrically with, a rotatable shaft to be grounded; and the other vessel is adapted to be mounted upon a grounded frame relative to which shaft 20 is rotatable. Although in the illustrated arrangement of FIG. 4 the upper vessel is shown mounted to shaft 20 and the lower vessel is shown mounted to frame 23, it is apparent that the concept of the invention is not so limited and that, alternatively, the lower vessel may be secured to the shaft 20 and the upper vessel secured to the stationary frame.

Accordingly, it has been shown that the device of the invention provides means for electrical grounding of a rotatable shaft, the functional parts of which grounding device are less subject to wear. Also, such grounding means for a rotatable shaft reduces ground current flow through the minimal contact area impedance of the bearing assembly of a shaft-to-be-grounded, as to reduce sparking, pitting and consequent wear of the bearings thereof, while providing a constant impedance path for ground currents, and hence allowing improved electrical welding quality. Such a device, for example, may be used to ground currents of 1000 amperes or more in connection with rotating electric welding equipment having an angular velocity of at least 300 r.p.m. If desired, such device may be safely employed in cooperation with a watercooled jacket, in order to further assure the constancy of the low grounding impedance provided by means of the device. Therefore, it is to be appreciated that an improved electrical grounding device has been disclosed.

Although the invention has been described and illustrated in detail, it is to be clearly understood that the same is by way of example only, and not by way of limitation, the spirit and scope of the invention being limited only by the scope of the appended claims.

I claim:

1. An electrical grounding device for cooperation with a rotatable shaft-to-be-grounded, and comprising
    a metallic casing adapted to be mounted in electrical contact with an earth potential, said casing providing an enclosure for a quantity of liquid mercury; and
    a metallic shaft mounted for rotation within said casing and having a portion extending externally thereof adapted to be mechanically coupled in electrical contact with said shaft-to-be-grounded, said mounted shaft having a plurality of metallic plates fixedly mounted thereon at longitudinally spaced intervals therealong and oriented substantially transversely thereof.

2. The device of claim 1 in which the enclosure provided by said casing is substantially a cylindrical volume generated about the longitudinal axis of said metallic shaft as an axis of revolution, and contains a quantity of liquid mercury adequate to contact at least a portion of the surface of each of said plates.

3. The device of claim 2 in which said quantity of liquid mercury provides a liquid level below a mounting of said metallic shaft within said casing, and in which a radial clearance between said plates and said enclosure and the longitudinal interval of said plates substantially reduces free-surface action of the mercury occurring due to changes in orientation of said casing.

4. The device of claim 2 in which there is further provided dust seal bearing means rotatably mounting said metallic shaft within said casing, for reducing contamination of said liquid mercury.

5. The device of claim 2 in which the radial extent of said casing is at least as great as the longitudinal extent thereof, whereby the over-all impedance of the device is thereby reduced.

6. The device of claim 5 in which the longitudinal spacing interval between transverse conducting surfaces formed by said casing and said plates is substantially less than the radial extent of said enclosure.

7. An electrical grounding device, comprising
   a first and second metallic vessel, each having mutually concentric outer and inner cylindrical sides to define an annular mouth therebetween at an axial extremity thereof, at least the like annular area at the other extremity thereof being sealed,
   said vessels being adapted to matingly engage, whereby the inner side of a second one of said vessels nests within the annular space between the sides of a first one of said vessels and the outer side of said first vessel nests within the annular space between the sides of said second vessel,
   said nested vessels adapted to be mounted in a vertical axial-orientation, whereby a lower one of the said vessels may contain a quantity of liquid mercury in contact with a portion of a nested side of the other of said vessels, one of said vessels being further adapted to be mounted concentrically with a rotatable shaft to be grounded and the other vessel adapted to be mounted to a grounded frame relative to which said shaft is rotatable.

References Cited
UNITED STATES PATENTS
2,597,713   5/1952   Duprat _____ 317—18

LEE T. HIX, *Primary Examiner.*

R. V. LUPO, *Assistant Examiner.*